(12) United States Patent
Beth Halachmi

(10) Patent No.: US 10,123,551 B2
(45) Date of Patent: Nov. 13, 2018

(54) SYSTEM AND METHOD FOR THE PREPARATION OF COOLED EDIBLE PRODUCTS

(71) Applicant: SOLO GELATO LTD., Hila (IL)

(72) Inventor: Barak Beth Halachmi, Hila (IL)

(73) Assignee: SOLO GELATO LTD., Hila (IL)

( * ) Notice: Subject to any disclaimer, the term of this patent is extended or adjusted under 35 U.S.C. 154(b) by 389 days.

(21) Appl. No.: 14/364,450

(22) PCT Filed: Feb. 11, 2013

(86) PCT No.: PCT/IL2013/050125
§ 371 (c)(1),
(2) Date: Jun. 11, 2014

(87) PCT Pub. No.: WO2013/121421
PCT Pub. Date: Aug. 22, 2013

(65) Prior Publication Data
US 2014/0335232 A1 Nov. 13, 2014

Related U.S. Application Data

(60) Provisional application No. 61/749,652, filed on Jan. 7, 2013, provisional application No. 61/650,734, filed (Continued)

(51) Int. Cl.
*A23G 9/00* (2006.01)
*A23G 9/04* (2006.01)
(Continued)

(52) U.S. Cl.
CPC .............. *A23G 9/045* (2013.01); *A23G 9/00* (2013.01); *A23G 9/04* (2013.01); *A23G 9/08* (2013.01); *A23G 9/22* (2013.01); *B65D 85/804* (2013.01)

(58) Field of Classification Search
CPC . A23G 9/22; A23G 9/04; A23G 9/045; A23G 9/52; A23G 9/14; A23G 9/00;
(Continued)

(56) References Cited

U.S. PATENT DOCUMENTS 3,858,498 A 1/1975 Swenson
4,364,666 A 12/1982 Keyes
(Continued)

FOREIGN PATENT DOCUMENTS

CN 1483375 A 3/2004
EP 0287194 A2 2/1988
(Continued)

OTHER PUBLICATIONS

C. Clarke., "The Science of Ice Cream; 2nd Edition" RSC Publishing, Cambridge, UK, pp. 2, 15-26 (2012).

*Primary Examiner* — Erik Kashnikow
*Assistant Examiner* — Lela S. Williams
(74) *Attorney, Agent, or Firm* — Browdy and Neimark, PLLC

(57) ABSTRACT

A novel system, machines and consumables, and method for preparation of cooled edible products from their ingredients, e.g. in a portioned amount constituting a defined number of servings which may be 1, 2, 3, etc. are provided. One example of such an edible product is ice cream.

11 Claims, 17 Drawing Sheets

Related U.S. Application Data on May 23, 2012, provisional application No. 61/598,481, filed on Feb. 14, 2012.

(51) Int. Cl.
- *A23L 5/10* (2016.01)
- *B65D 85/804* (2006.01)
- *A23G 9/08* (2006.01)
- *A23G 9/22* (2006.01)

(58) Field of Classification Search
CPC . A23G 9/08; A23G 9/16; A23G 9/163; A23G 9/28; B65D 85/00; B65D 85/78; B65D 85/804

See application file for complete search history.

(56) References Cited

U.S. PATENT DOCUMENTS

| | | |
|---|---|---|
| 4,632,566 A | 12/1986 | Masel et al. |
| 4,755,060 A | 7/1988 | Pedersen et al. |
| 5,069,364 A | 12/1991 | McGill |
| 5,893,485 A | 4/1999 | McGill |
| 5,967,023 A | 10/1999 | Acknin et al. |
| 6,267,049 B1 | 7/2001 | Silvano |
| 6,438,987 B1 | 8/2002 | Pahl |
| 6,490,872 B1 | 12/2002 | Beck et al. |
| 7,254,490 B2 | 8/2007 | Charlton |
| 8,899,063 B2 | 12/2014 | Ugolini |
| 2003/0085237 A1 | 5/2003 | Kateman et al. |
| 2004/0154316 A1 | 8/2004 | Kateman |
| 2006/0137542 A1 | 6/2006 | Bravo |
| 2006/0150821 A1 | 7/2006 | Paul et al. |
| 2010/0058772 A1 | 3/2010 | Russo et al. |
| 2010/0239734 A1* | 9/2010 | Yoakim .................. A47J 31/22 426/433 |
| 2010/0242497 A1* | 9/2010 | Bertone ................. A23G 9/045 62/1 |
| 2010/0263546 A1 | 10/2010 | Leuzinger et al. |
| 2011/0020508 A1 | 1/2011 | Santoiemmo |
| 2012/0096876 A1 | 4/2012 | Ravji |
| 2012/0199227 A1 | 8/2012 | Manser et al. |
| 2012/0251677 A1 | 10/2012 | Yoakim et al. |
| 2013/0095214 A1 | 4/2013 | Ozanne et al. |
| 2013/0122157 A1 | 5/2013 | Dogan et al. |

FOREIGN PATENT DOCUMENTS

| | | |
|---|---|---|
| EP | 1254603 A2 | 11/2002 |
| EP | 1369069 A | 10/2003 |
| EP | 1378176 A2 | 1/2004 |
| EP | 2508080 A1 | 10/2012 |
| JP | 2006-304602 | 10/2005 |
| WO | 2006013362 A1 | 2/2006 |
| WO | 2008068124 A1 | 6/2008 |
| WO | 2010082185 A1 | 7/2010 |

\* cited by examiner

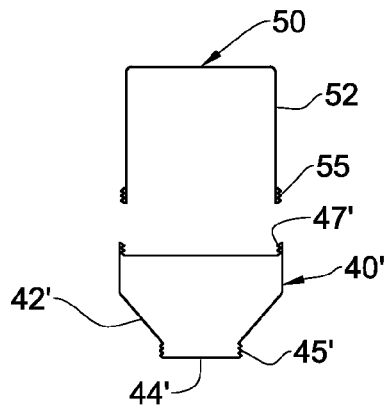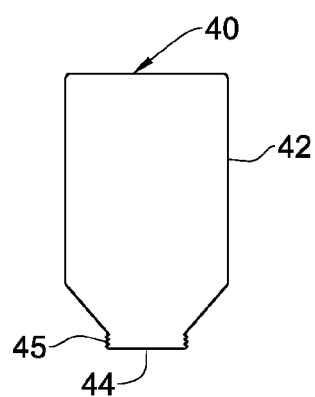
Fig. 4    Fig. 5
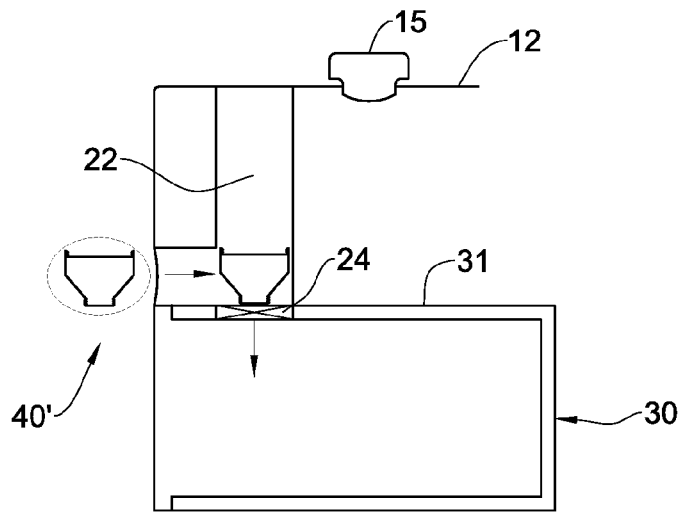
Fig. 6
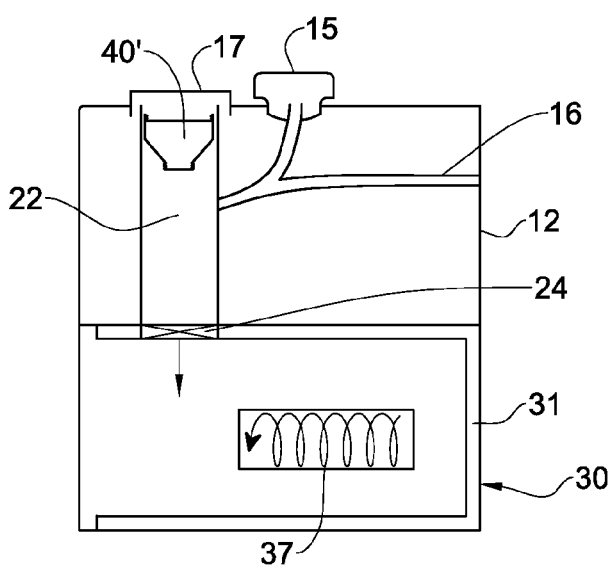
Fig. 7

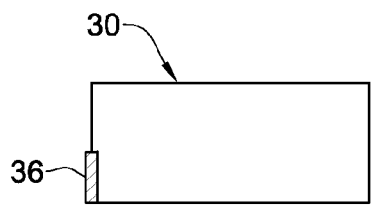
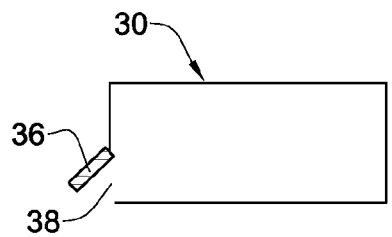
Fig. 8                                    Fig. 9
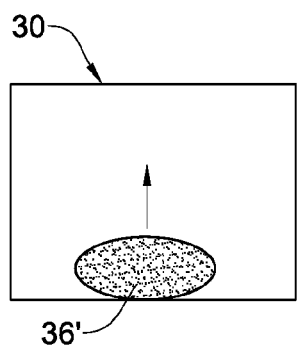
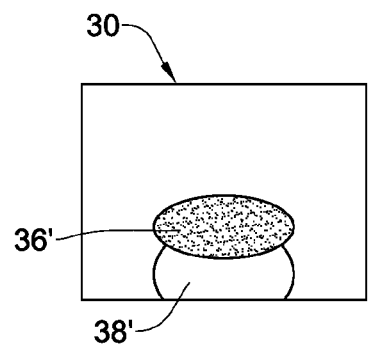
Fig. 10                                   Fig. 11
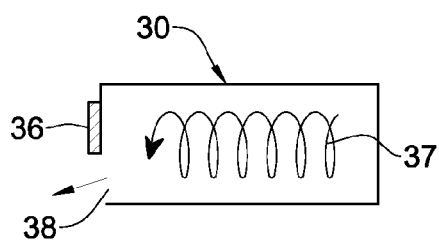
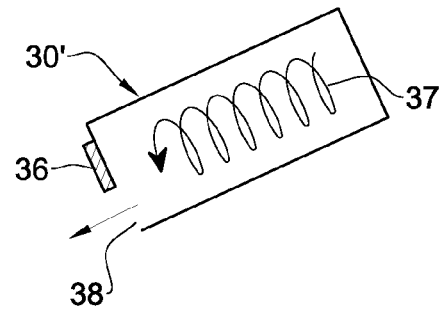
Fig. 12                                   Fig. 13

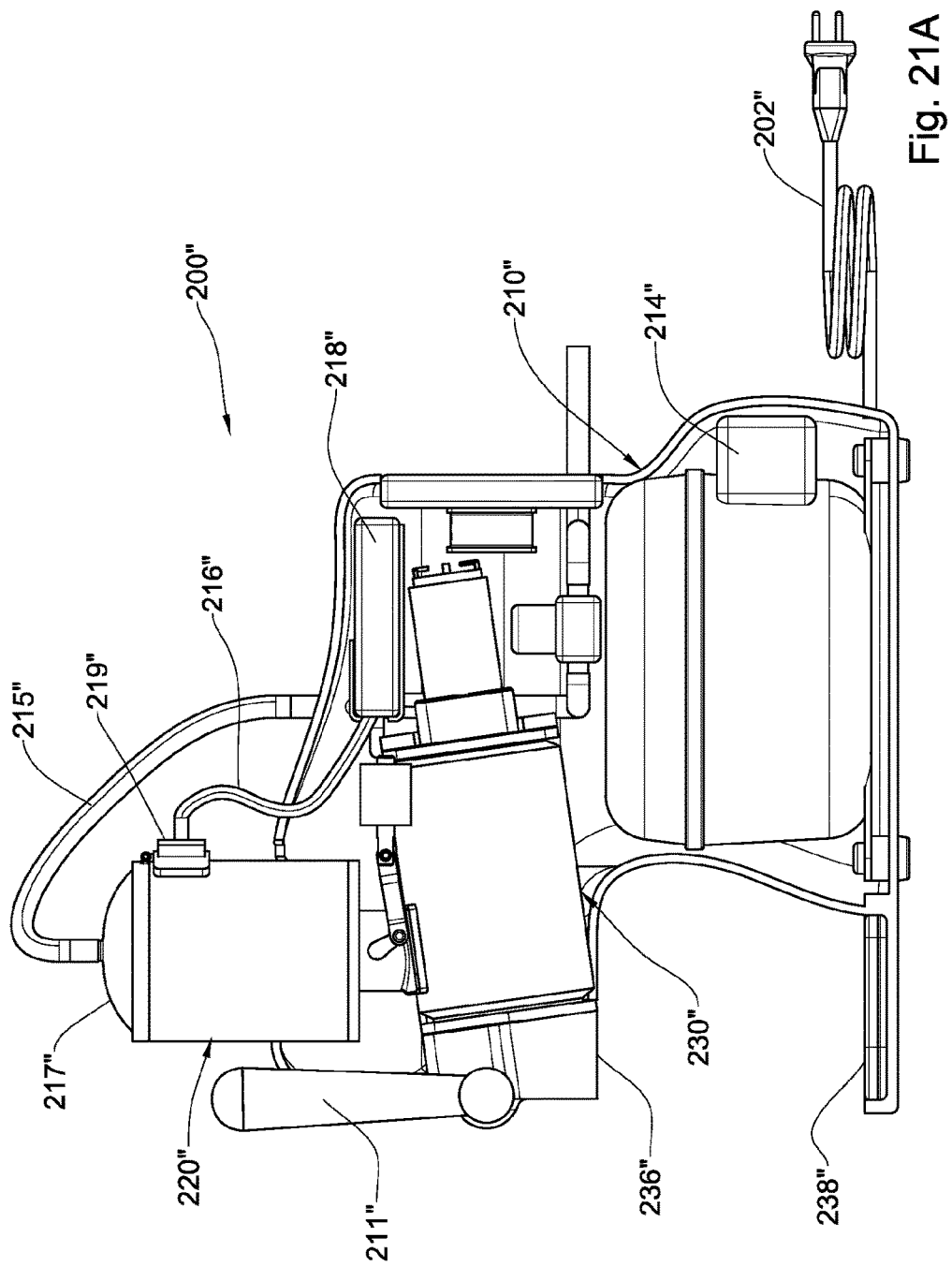

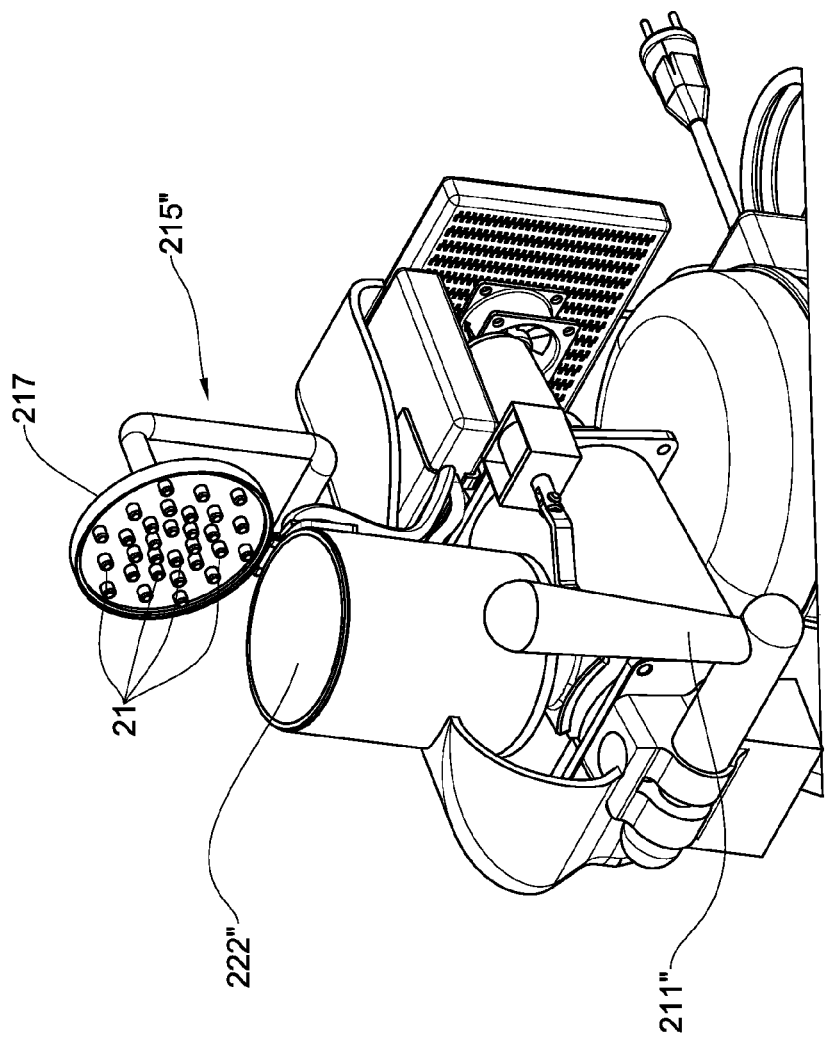

SYSTEM AND METHOD FOR THE PREPARATION OF COOLED EDIBLE PRODUCTS

FIELD

This invention relates to systems for the domestic and/or non-industrial preparation of cooled edible products, in particular, ice creams, frozen yogurts, sorbets, milkshakes, smoothies etc.

BACKGROUND

In general, preparation of ice cream involves mixing of desired edible ingredients for forming a mixture, adding gas/air into the mixture (sometimes a by-product of the mixing itself) in order to soften the texture of the mixture and cooling of the mixture.

At present, the majority of ice creams are produced in an industrial process. In this process, ice cream is produced in large volumes and then separated into packages of various sizes and shipped and sold as such to the end users.

There are also known machines for domestic preparation of ice cream, allowing the user to prepare ice cream from a mixture of edible ingredients of his liking.

In principle, in such domestic ice cream machines, the user prepares a mix made of ingredients selected by him and introduces the mix into the machine which then cools the mix while mixing. Some machines have a built-in cooling arrangement while others only perform mixing, wherein the user is required to transfer the mix, or the machine itself, into the freezer (or any other cooling chamber).

GENERAL DESCRIPTION

The subject matter of the present application provides a novel system, machines and consumables, for preparation of cooled edible products from their ingredients, e.g. in a portioned amount constituting a defined number of servings which may be 1, 2, 3, etc. One example of such an edible product is ice cream.

Under the subject matter of the present application, ingredients for production of the cooled edible product are contained in a receptacle (for example in the form of a 'pod') which is brought into association with a machine in a manner permitting content of the receptacle (which may be most, or at times the entire content of the receptacle) to be extracted by the machine. The machine is then operated to produce the edible product.

The receptacle carries data that is indicative of process parameters to be applied by the machine to prepare said product. The data is formatted so as to permit reading by a data reader in the machine. The data may be embedded in an optically-readable data label, e.g. a barcode, or may be embedded in an electromagnetic element such as an RFID element. Once the receptacle is brought into association with the machine, content thereof is extracted and the data is read by the data reader. Such data, once read, is fed into a controller of the machine that induces the machine to operate in a manner applying said process parameters to the processing of the edible ingredients to thereby obtain the cooled edible product.

The cooled edible product is a product that when consumed has a solid or semi-solid consistency, such as ice creams, frozen yogurts, sorbets, milkshakes, smoothies etc.

According to one aspect of the subject matter of the present application, there is provided a system for the preparation of a cooled edible product from ingredients, said system comprising:
- a receptacle holding at least some of the ingredients, and a processor for processing the ingredients and producing the cooled edible product therefrom, the processor comprising or being associated with a data reader;
- the receptacle being configured for association with the processor in a manner permitting the majority of the content of the receptacle to be extracted by the processor;
- the receptacle carrying data indicative of process parameters specific for said processing, the data being formatted in a manner permitting its identification by the data reader to thereby induce the processor to apply said process parameters to said processing.

The processing arrangement of said machine can comprise a mixing chamber configured for mixing the edible ingredients contained within the receptacle to form a pre-cooled mixture. In particular, the mixing chamber can be configured for receiving therein at least one additional ingredient from a source other than the receptacle.

The processing arrangement can also comprise an aeration arrangement configured for introducing gas into a given mixture to form an aerated mixture, and a cooling arrangement configured for reducing the temperature of a mixture contained therein to provide a cooled mixture. However, it is appreciated that the aeration of the mixture can also be performed as part of the mixing process in the mixing chamber, i.e. by mixing the ingredients, the mix is naturally aerated.

The cooling arrangement may comprise a cooling chamber adapted for receiving the mixed ingredients and holding them for a time sufficient for them to cool. The cooling chamber may also, by one embodiment, serve as a mixing chamber and be provided with at least one rotating element configured for agitating, shearing and/or mixing the ingredients during cooling, as well as scraping off material from the inner walls of this combined cooling and mixing chamber.

The rotating element can be constituted by, for example, a dasher, an auger and/or a combination thereof. Respectively, the ingress and egress directions of material into and out of the cooling chamber can vary. For example, in case of an auger, the ingredients ingress into the cooling chamber at one end of a longitudinal axis of the auger, be progressed therealong and discharged at the other end. By another embodiment, the cooling chamber or a combined cooling and mixing chamber, has a single opening serving for both ingress of the ingredients and egress of the cooled edible product.

The machine can also be provided with a defrosting arrangement disposed between the mixing chamber and the cooling chamber, and configured for preventing the passageway between the chambers from being clogged due to freezing (as one side of the passageway is opened to the cooling chamber).

In accordance with a particular example, the defrosting arrangement can comprise a heat source associated with the passageway and configured for heating thereof.

In addition, the machine can also comprise a discharge arrangement configured for evacuating any residual material contained in the passageway between the mixing chamber and the cooling chamber, during or following the production of the cooled edible product. This can allow the machine to operate continuously without requiring any disassembling thereof between production sequences.

In addition, the machine can be configured so as not to begin a new production sequence before the passageway between the mixing chamber and the cooling chamber is properly cleared of the cooled edible product prepared during a previous sequence.

The machine may be formed with an outlet configured for dispensing the cooled edible product. The outlet may be adapted to receive and hold a patterning element, configured for providing the edible product discharged through the outlet opening with a particular shape and/or pattern.

In particular, a patterning element can be in the form of a perforated disc, so that when the edible product is pressed through the perforation(s) it assumes a cross-sectional shape which is that of the perforation(s).

The process parameters can be any parameter of an operation constituting part of the preparation of the cooled edible product and affecting its final characteristics. For example, the process parameters can be at least one of the following:

mixing time of the at least one ingredient;
quantity of an additional ingredient;
introduction time of an additional ingredient;
aeration time of a mixture of the at least one ingredient;
amount of gas introduced into a mixture of the at least one ingredient during its aeration time;
cooling time of an aerated mixture of the at least one ingredient;
revolution velocity of the dasher of the cooling chamber;
temperature reduction of an aerated mixture of the at least one ingredient;
pressure within the mixing and cooling chambers;
diameter of an outlet through which said edible product is provided;
provision rate of said edible product through an outlet;
size of the valve opening between the mixing chamber and the cooling chamber;
opening frequency/time of the valve opening between the mixing chamber and the cooling chamber.

The arrangement can be such that said process parameters are configured for determining processing of the at least one edible ingredients after its extraction from said receptacle. In other words, the process parameters relate to all steps of preparation of the cooled edible products, not only operations taking place within the receptacle.

The controller can also be configured for controlling the valve opening between the mixing chamber and the cooling chamber, for example, for providing a gradually increasing/decreasing opening diameter thereof. Such control may allow optimizing the preparation process of the cooled edible product.

In addition, the controller can be configured for regulating operation of the dasher of the mixing chamber, e.g. by providing a variable revolution speed during the preparation process depending on various stages.

The controller can also be programmed to alert the user regarding required cleaning of the machine and to prevent use of the machine if such cleaning is not performed. This can happen under various circumstances, non-limiting examples of which are:

a predetermined amount of time has passed without proper cleaning of the machine;
residual ingredients are left within the machine, in particular within the passageway leading from the mixing chamber to the cooling chamber;
the controller does not receive an indication regarding parameters pointing to a successful emptying of the cooled edible product from the machine at the end of a previous manufacturing sequence;
different types of cooled edible products are attempted to be prepared successively, e.g. sorbet following yogurt.

In all of the above cases, the controller can prevent the machine from preparing the cooled edible product and alert the user that a cleaning process should be performed before performing another preparation sequence.

Per the above, the controller can be programmed to monitor different parameters of operation of the machine, for example, the last time of use, type of edible products prepared etc. The controller can also be fitted with a memory unit for storing the required data and providing statistics based thereon.

In addition, the controller can be provided with the ability to download data for maintenance purposes, for example, firmware updates from the manufacturer website.

The process parameters may also include other elements such as, for example, configuring the machine so that unless mixing was properly performed and accomplished and/or unless the outlet opening was properly opened for a predetermined amount of time, the machine will not allow use of another receptacle. Another example is a control of the revolution speed of the mixing element upon discharge of the edible product from the machine, as well as the amount of time in which the outlet is opened for such discharge.

Typically, the operation of the machine is so that one or both of the following is prevented:

mixing of ingredients from different receptacles; and
ingredients from previous run of the machine remaining within the cooling and/or mixing chamber before a new run of the machine.

The receptacle can be in the form of a pod, and can be configured for forming, once received in the machine, a functional component in addition to being the carrier and source of said ingredients. For example, once in situ in the machine the pod may define at least part of the mixing chamber. In this case, mixing of the edible ingredients may take place, at least partially, within the pod itself.

Alternatively, according to another example, said receptacle can be configured for being externally associated with said machine, i.e. with the majority of the receptacle protruding from the machine.

Nonetheless, in both of the above examples, said receptacle can be configured for mixing therein of the at least one edible ingredients.

According to a specific design, the pod can be constituted by a pod assembly and comprise at least a first receptacle and at least a second receptacle, each containing a different ingredient for producing the cooled edible product.

The arrangement can be such that each pod assembly is part of a type of desired cooled edible product, for example, pod assemblies configured for producing sorbets, pod assemblies configured for producing frozen yogurts etc.

Per the above, it could be possible, for example, for an individual to obtain a first type receptacle, and attach thereto a variety of second receptacles of the same type and vise versa. In particular, an individual can equip a first, sorbet type receptacle containing the solid ingredients for producing the sorbet (for example) with a plurality of second, sorbet type receptacles containing a variety of fluid ingredients, e.g. juices of different flavors, and so produce a variety of sorbets.

However, it is appreciated that the first receptacle and the second receptacle can be sold/provided independently. It is noted that although the receptacles can be mixed and matched, assembling the right types of first and second receptacles can be required in order to obtain an optimal quality of the cooled edible product.

In order to prevent mismatch between different types of pod assemblies, a first receptacle of one type can only be assembled/attached to a second receptacle of the same type (e.g. a first, sorbet receptacle can only be attached to a second, sorbet receptacle but not to a second, frozen yogurt receptacle).

By an embodiment of the current disclosure, the receptacle can be provided as part of an assembly that includes also an element configured for receiving the edible product produced by the machine, whereupon the edible product may be consumed directly therefrom. Thus, the assembly constitutes a complete set, comprising a receptacle providing the ingredient and an element for receiving and for eating the edible product out of.

In accordance with another embodiment, the receptacle itself has a dual function: as a carrier of the ingredients and subsequently as a receptacle for finished edible product. Thus, the receptacle may thus be extracted from the machine and thereafter be used as a receptacle for the edible product.

By one embodiment the machine is configured for revolving said receptacle, thereby allowing mixing of the material contained therein. According to another embodiment, the machine comprises a mixing member configured for mixing said at least one edible ingredient within the receptacle.

The machine can further comprise an arrangement configured for the provision of at least one additional edible ingredients into said mixing chamber to be mixed with the at least one ingredient contained within said receptacle.

By an embodiment of the current disclosure, the machine can be configured for simultaneously receiving therein more than one receptacle, for producing cooled edible products from a mixture of ingredients provided by the more than one receptacle. Furthermore, the arrangement can be such that the ingredients of some pods are provided to the mixing chamber while ingredients of the remaining pods are provided directly to the cooling chamber or directly to the outlet port.

It is appreciated that under the above example, the machine can comprise a plurality of readers, each being configured for obtaining the data provided by its respective pod. The controller can be configured for integrating the data received from various pods in order to determine the process parameters for preparation of the edible product from the different pods.

Furthermore, according to a particular example, the machine can be formed with different ports, each being configured for receiving therein pods of different designs, each pod carrying a different set of ingredients and configured for contributing to the production of the cooled edible product.

In particular, by the embodiment of the previous paragraphs, at least the following combinations are made possible:
  a first pod containing edible ingredients and a second pod containing fluids. For example, the first pod can contain the ingredients for producing chocolate ice cream (e.g. sugar, cocoa and functional ingredients) while the second pod can contain a flavored fluid (e.g. orange juice), thereby producing orange flavored chocolate ice cream;
  a first pod containing edible ingredients and a second pod containing a topping of some sort, e.g. sprinkles, chocolate chips etc.;
  several pods containing different ingredients for producing an enlarged dose of ice cream having a mixed flavor; and
  a plurality of pods, each containing ingredients for the production of the edible product, allowing successively producing of consecutive portions of the edible product without re-charging the machine with a pod after every batch.

In general, the machine can be provided with a data reader, a controller and a drive motor, such that the data reader is configured for obtaining the data provided on the receptacle and transfer it to the controller, and the controller is configured for using this data for controlling the operation of the drive motor operating the various arrangements of the machine.

It is also appreciated that the controller can be configured for controlling any other of the machine's components and functions, e.g. the cooling chamber, provision of fluids, operation of the valve/s etc.

The data reader of said machine and the data provided on said receptacle can be, for example, at least one of the following:
  a barcode scanner and a barcode;
  an RFID reader and an RFID tag;
  an optical scanner and a graphic pattern;
  a magnetic strip and a magnetic reader;
  depressible elements and a pattern of bulges for depressing said depressible elements.

The controller can also be responsible for handling malfunctions and tech-support of the machine. In particular, in the event of a malfunction, the controller can be configured to output a malfunction code which can be provided to a service company. The malfunction code can either be provided to the company by the user or automatically by the machine, allowing the service company to form a record regarding repeating malfunctions etc.

Furthermore, the data transferred between the pod and the controller can also comprise authentication information regarding the pod (e.g. indication of a genuine pod or a 'third party' pod). Authentication can be performed, for example, by a serial number associated with the pod, optionally including some mathematical algorithm applied to the serial number. This also facilitates preventing re-use of the same pod and/or serial number/code twice within the same machine.

In addition, the data can also include information regarding the expiration date of the ingredients within the pod, preventing the use of pods, the date of ingredients of which has already expired. This feature can also be particularly useful for facilitating constant replacement of series of receptacles and complementary authentication codes, thereby preventing a third party from using the authentication codes of old receptacle series (not sold anymore on the market).

In addition, the machine can also comprise a mechanism configured for deforming the used receptacle/pod/capsule after use thereof, e.g. crushing or compressing it. Such a mechanism may allow for a more compact waste volume of the used capsules as well as for preventing re-use of the pod itself.

In accordance with a particular design of the above described system, it can furthermore comprise a complementary cooling arrangement configured for accelerating the cooling process taking place in the cooling chamber.

In particular, the complementary cooling arrangement can be provided with a cooling fluid at below-zero temperature configured for either mixing with the ingredients of the receptacle within the mixing chamber and/or cooling chamber or coming into contact with an external surface of the mixing chamber and/or cooling chamber in order to facilitate cooling.

The cooling fluid can be a solid (e.g. $CO_2$ in solid form at about 80° C. below zero), a fluid (e.g. liquid Nitrogen at 180° C. below zero, liquid Oxygen at 220° C. below zero) or even a gas.

According to one example, the cooling arrangement can comprise a cooling port configured for receiving therein a pod containing a pre-determined amount of cooling fluid, commensurate to the portioned amount of cooled edible product to be prepared using the machine. However, it is appreciated that the cooling arrangement can alternatively comprise a receptacle configured for containing the cooling fluid and distributing a required amount of cooling fluid during the manufacturing process of the cooled edible product.

Per the above, the complementary cooling arrangement can provide the option for expedited preparation (also referred herein a 'turbo mode') of the cooled edible product, requiring considerably less time than when using the cooling chamber in its own.

According to another aspect of this disclosure there is provided an appliance for the preparation of a cooled edible product, said appliance comprising a processor for processing the ingredients and producing the cooled edible product therefrom; the processor comprising or being associated with a data reader; said machine being further configured for association with a receptacle containing one or more of the edible ingredients to be processed and carrying data indicative of process parameters specific for said processing, the data being formatted in a manner permitting its identification by the data reader to thereby induce the processor to apply said process parameters to said processing.

The appliance can further be configured for receiving a cleaning receptacle containing at least one cleaning agent and for the initiation of a cleaning sequence for cleaning the appliance. The cleaning receptacle contains cleaning agents and typically carries a data unit indicative of process parameters to be applied by the appliance for cleaning.

In particular, the cleaning receptacle can comprise a data unit containing data associated with predetermined process parameters for the cleaning of the appliance. However, it should also be appreciated that a cleaning pod can be provided with data indicative of process parameters which are unique for a cleaning process and differ from the process parameters required for the preparation of cooled edible products.

The appliance can be configured to use the cleaning receptacle in order to rinse elements of the appliance, e.g. mixing chamber, cooling chamber etc. The fluid used for rinsing the components can be discharged from the appliance to the outside environment (for example into an external receptacle). Alternatively, the appliance can be configured with proper conduits allowing the discharge of rinsing fluids directly into a drainage system (for example to a drain pipe of a sink).

In addition, the appliance can comprise a rinsing arrangement configured for providing the appliance with heated rinsing fluid during a cleaning process using the cleaning receptacle. According to one example, the rinsing arrangement can be configured for connection to a water supply network external to the appliance. Alternatively, according to another example, the rinsing arrangement can comprise as a rinsing chamber containing therein rinsing fluid and means for heating thereof prior to its provision to the appliance.

It is noted that the rinsing fluid does not have to include any detergents or cleaning agents and can simply be constituted by water. As previously described, the appliance can be configured for receiving therein a cleaning receptacle containing the required detergents and configured for operating in conjunction with the rinsing fluid.

The rinsing arrangement can also comprise at least one cleaning nozzle configured for providing a directional jet of rinsing fluid to various components of the appliance, for example, the valve between the mixing chamber and the cooling chamber, and the outlet opening in order to rinse therefrom any residual ingredients or leftovers of the cooled edible product.

According to another aspect of the subject matter of the present application there is provided a receptacle containing at least one edible ingredient for the preparation of a cooled edible product by applying process parameters, and carrying data indicative of the process parameters, said data being readable by a data reader of a processor that can be configured for applying said process parameters to said ingredients.

According to a further aspect of the subject matter of the present application there is provided a system for the preparation of a cooled edible product from ingredients, said system comprising a receptacle holding at least some of the ingredients, and a processor for processing the ingredients and producing the cooled edible product therefrom, the processor comprising or being associated with a data reader; the receptacle being configured for association with the processor in a manner permitting at least some of the content of the receptacle to be extracted by the processor; the receptacle carrying data indicative of process parameters specific for said processing, the data being formatted in a manner permitting its identification by the data reader to thereby induce the processor to apply said process parameters to said ingredients during processing also after being extracted from the receptacle.

According to still another aspect of the subject matter of the present application there is provided a system for the preparation of a cooled edible product from ingredients, said system comprising a receptacle holding at least some of the ingredients, and a machine for processing the ingredients and producing the cooled edible product therefrom, the receptacle being configured for association with the machine in a manner permitting at least some of the content of the receptacle to be extracted by the machine; wherein the receptacle carries data indicative of process parameters specific for said processing, the data being formatted in a manner permitting its identification by a designated data reader of the machine to thereby induce the machine to apply said process parameters to said processing; and wherein said processing includes processing the edible ingredients after their extraction from said receptacle.

A further aspect of the subject matter of the present application is directed to a system for the preparation of a cooled edible product from ingredients, said system comprising a receptacle holding at least some of the ingredients, and a processor for processing the ingredients and producing the cooled edible product therefrom; the processor comprises a receptacle port for matchingly receiving therein the receptacle in a manner permitting at least some of the content of the receptacle to be extracted by the processor; the processor being configured for processing the edible ingredients after their extraction from said receptacle In accordance with a further aspect of the disclosed subject matter, there is provided a temperature regulation module configured for being interposed between a liquid source and a home appliance making use of said fluid, said temperature regulation module being configured for receiving liquid from the liquid source, regulating its temperature and transferring into the appliance, said module comprises a controller in communication with a controller of the appliance, so that control of the temperature is performed in accordance with data provided by the controller of the machine.

The above temperature regulation module can also be used in conjunction with additional devices requiring provision thereto of a fluid at a certain temperature, e.g. espresso machines, coffee machines, percolators, water bars), wherein it is configured for communicating with the controller of such devices in order to determine the temperature of the fluid based on data therefrom.

In addition, the temperature regulation module can also be configured for providing the heated/cooled fluid directly to the user for such purposes as preparing hot beverages, baby bottles etc.

It should be appreciated that modern kitchens are equipped with a plurality of devices, each being provided with its own heating/cooling module and a corresponding controller. In accordance with the above aspect, the temperature regulating module can be configured for servicing any such device, thereby eliminating the need for an individual heating/cooling module in each of the devices.

The temperature regulating module can be provided with a fluid inlet port and at least one fluid outlet port which can be selectively coupled to a device of the user's choosing. The module can further comprise a valve configured for directing the fluid into a specific outlet port in accordance with the controller.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4 and 5 are schematic cross-sectional views of two variations of the pod shown in FIG. 3;

FIG. 6 is a schematic cross-sectional view of a variation of the machine shown in FIG. 1, demonstrating insertion of a pod therein;

FIG. 7 is a schematic cross-sectional view of another modification of the machine shown in FIG. 1;

FIGS. 8 and 9 are schematic cross-sectional views showing a possible opening configuration of an outlet port of the machine shown in FIG. 1;

FIGS. 10 and 11 are schematic cross-sectional views showing another example of a possible opening configuration of an outlet port of the machine shown in FIG. 1;

FIGS. 12 and 13 are schematic cross-sectional illustrations of examples of orientation of a cooling chamber of the machine shown in FIG. 1;

FIG. 21A is a schematic isometric view of another example of the machine according to the subject matter of the present application during a first position thereof, with a housing thereof being partially removed for illustration purposes;

FIG. 21D is a schematic enlarged view of a portion of the machine shown in FIG. 21C;

DETAILED DESCRIPTION OF EMBODIMENTS

Figure 1:
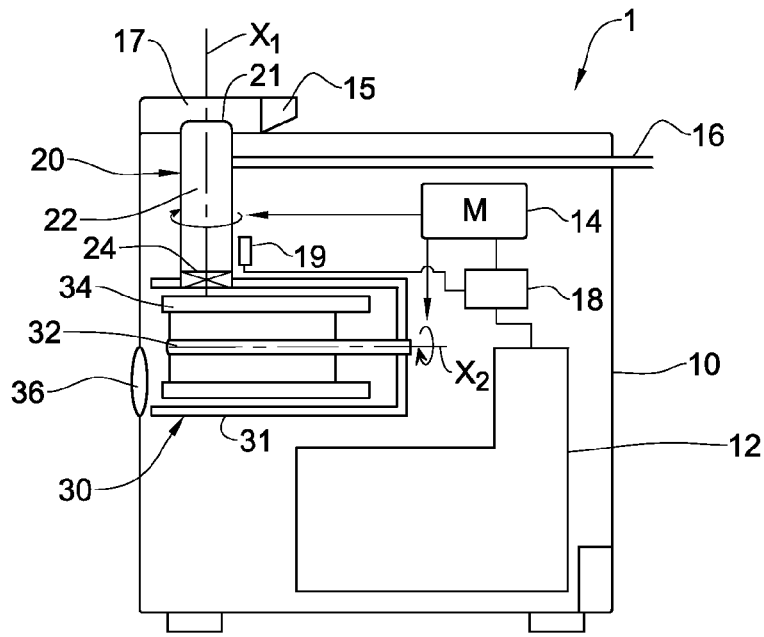
FIG. 1 is a schematic cross-sectional view of a machine according to the subject matter of the present application.

Attention is first drawn to FIG. 1, in which a system for the domestic preparation of a cooled edible product (e.g. ice cream) is shown, generally designated as 1. The system 1 comprises a housing 10, a mixing module 20, and cooling module 30, both modules 20, 30 being contained within the housing 10. The system 1 further comprises a pod 40 (shown in FIG. 3) containing at least one ingredient of the cooled edible product, the pod 40 configured for being received within the housing 10.

The housing 10 also comprises a cooling arrangement 12 configured for removing heat from the cooling module 30, and a drive motor 14 configured for driving ingredients of both the mixing module 20 and the cooling module 30. It is appreciated that individual motors can be provided for each of the mixing module, cooling module etc.

The housing 10 further comprises a cover 17 located over an inlet 21 of the mixing module, a user fluid inlet 15 and a built-in fluid inlet 16, both inlets 15, 16 leading to the mixing module 20.

Figure 2:
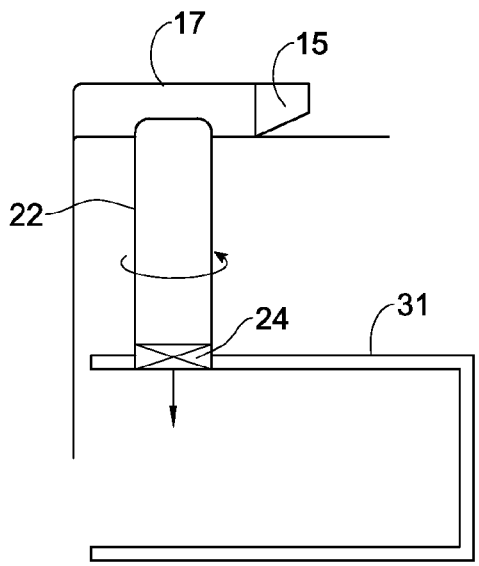
FIG. 2 is a schematic enlarged view of detail A shown in FIG. 1.

With additional reference being made to FIG. 2, the mixing module 20 is formed with a cavity 22 configured for receiving therein a pod 40 (shown in FIG. 3) via the inlet 21. The mixing module 20 further comprises a valve 24 configured for selectively allowing/preventing fluid communication between the mixing module 20 and the cooling module 30.

It is appreciated that the arrangement can be such that the pod 40 comprises the valve itself while the machine is formed with a corresponding engagement port configured for operating the valve.

The mixing module 20 also comprises a mixing arrangement (not shown) powered by the drive unit 14 and configured for revolving the pod 40 about a central axis $X_1$ thereof in order to allow mixing of the substance contained therein.

The cooling module comprises a chamber 31 having a main cavity fitted with a dasher having a central shaft 32 and mixing elements 34. The shaft 32 and mixing elements 34 are configured for revolving about the axis $X_2$ of the shaft in order to provide further mixing of the substance contained therein.

The chamber 31 is cooled by the cooling arrangement 12 so that the substance contained within the cooling module 30 and coming in contact with the wall of the chamber 31 is reduced in temperature. In this connection, it is important to note that the mixing element 34 are also configured for scraping off portions of the mixture which stick to the inner wall of the chamber 31, as they freeze.

The cooling module 30 also comprises an outlet port 36 configured for providing the cooled edible product to the user of the system 1.

The operation of the cooling arrangement 12 and the drive motor 14 is configured for being controlled by a controller 18. The controller can be further configured for receiving data signals from a transmit-unit 19 associated with the mixing module 20, and issuing corresponding commands to the cooling arrangement 12 and the drive motor 14.

Figure 3:
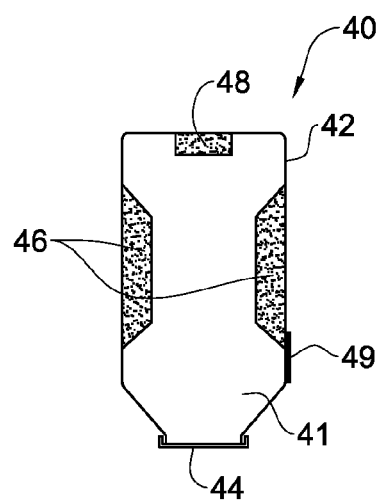
FIG. 3 is a schematic cross-sectional view of a pod used in the machine shown in FIGS. 1 and 2.

Turning now to FIG. 3, a basic design of a pod 40 is shown, comprising a body 42 with a central cavity 41, an outlet port 44 and inner side winglets 46 and top winglet 48, configured for mixing the ingredients contained within the pod 40.

In addition, the pod 40 comprises a data unit 49 which is configured for providing the system 1 with data regarding preparation parameters of the cooled edible product. The parameters in the data unit 49 are specific for the edible substance contained within the pod 40 and its state (solid, slurry, fluid etc.).

The data unit 49 is configured for communication with the transmit-unit 19 of the housing 10 in order to provide it with the necessary parameters which can then be transmitted to the controller 18.

Reference is now made to FIG. 5, in which the outlet port 44 can be formed with a thread 45 configured for secure attachment of the pod 40 to the mixing chamber 20, which is, in turn, formed with a corresponding threaded portion.

With particular reference to FIG. 5, the pod 40 illustrates a "wet-pod", i.e. a pod comprising an edible substance which is mixed with fluid, so that at least the majority (if not all) of the ingredients required for the preparation of the edible product are already contained within the pod 40. In this case, the pod can be inserted into the mixing module 20 and no additional fluid may be required for producing the cooled edible product.

Alternatively, with reference to FIG. 4, the pod 40' can be a "dry-pod", only containing some of the edible ingredients for the preparation of the edible product. In this case, the user can be provided with an additional member 50, configured for providing the "dry-pod" 40' with the required fluids for the preparation of the edible product. In particular, the user can fill the additional member 50 with a desired fluid of his/her choice and then attach the additional member 50 to the dry-pod 40', thereby forming a pod assembly similar to that of the pod 40.

The dry-pod 40' and the portion 50 can be configured for engagement with one another via a thread 47', 55, but it is appreciated that various means of connection therebetween can be provided, not limited to threading. In case of the dry-pod 40', the pod 40' resembles a capsule (similar to that which can be found in coffee machines).

With reference to FIGS. 6 and 7, another embodiment of the machine is shown in which the dry-pod 40' is configured for insertion into the machine (without an additional member 50), similar to a pod for a coffee machine. In this case, the required fluids are provided directly into the mixing chamber 20 of the machine to be mixed with the substance of the dry-pod 40'.

In particular, FIGS. 6 and 7 demonstrate two configurations of insertion of the pod 40' into the machine, one from the side (FIG. 6) and one from the top (FIG. 7).

In both the wet-pod 40 and the dry-pod 40', the arrangement is such that the pod 40, 40' is configured for constituting a part of the mixing cavity 22.

In addition, regardless of which pod is used, fluid can be provided to the mixing cavity 22 either manually by the user via opening 15 or via a built-in inlet 16 which can be connected to the domestic water supply, bottle-port, etc.

In operation, the pod 40, 40' is first inserted into the mixing chamber 20. Once inserted, the data unit 49 provides the transmit unit 19 with the necessary preparation parameters which are then transmitted to the controller 18.

The processing parameters can be either one of a variety of parameters, for example:
mixing time of the at least one ingredient;
quantity of an additional ingredient;
introduction time of an additional ingredient;
aeration time of a mixture of the at least one ingredient;
amount of gas introduced into a mixture of the at least one ingredient during its aeration time;
cooling time of an aerated mixture of the at least one ingredient;
temperature reduction of an aerated mixture of the at least one ingredient;
diameter of an outlet through which said edible product is provided; and
provision rate of said edible product through an outlet.

Once the process parameters are acquired by the controller 18, preparation of the cooled edible product can commence.

The controller 18 first determines whether or not an additional fluid is required, and in the positive, either alerts the operator of the machine to add the fluid via the inlet 15 or automatically provides it via the inlet 16.

Once all the ingredients are contained within the mixing chamber 20, the drive unit 14, controlled by the controller 18, begins its operation and the edible ingredients are mixed together to form a mix. The mixing time, mixing rate etc. are all determined by the process parameters previously provided to the controller 18.

Once the ingredients are properly mixed within the mixing module 20, the controller 18 operates the valve 24 in order to allow the mix to flow into the mixing chamber 31 of the cooling arrangement 30.

The mix is then aerated and cooled to the necessary temperature (also determined based on the process parameters) and once it reaches a desired temperature/pressure/texture etc., the cooled edible product can be delivered to the user via the opening 36.

It is appreciated that for different types of ice cream, different process parameters are required in order to properly accentuate the flavors of that particular ice cream type, including texture, temperature sensation on the tongue and palate, stability of the ice cream before melting etc.

Several examples are provided below:

when making chocolate ice cream having a high sugar/dextrose level, it may be desired that the ingredients are cooled for a longer duration of time; The same may hold true for the preparation of a sorbet with an alcoholic substance; and when making a nut ice cream with a high fat percent, it may be desired to reduce the revolution speed of the dasher.

In addition:

A "wet-pod" will normally require a shorter/slower mixing process, then a "dry-pod" which content is mixed with additional materials.

A product based on a mix calculated for a low freezing point, may require a longer cooling process and or a higher level of temperature reduction.

A product based on a high level of solids, and planned for a low level of over-run, may require slower turning of the dasher and or a longer process.

With reference being made to FIGS. 8 to 11, the opening 36 can be of various configurations, for example, in the case of FIGS. 8 and 9 to tilt about a pivot point and in case of FIGS. 10 and 11, to slide up and down.

It is noted that the cooling module 30 comprises a mixing arrangement (shaft 32 and elements 34) which is configured so as to propel the product towards the opening 36. So long as the opening is closed, pressure is applied to the edible product and, when a desired pressure is reached (also determined by the process parameters), the controller can signal the outlet 36 to open.

With reference to FIGS. 12 and 13, provision of the cooled edible product to the user can be made either solely by pressure applied on the product by the mixing shaft 32 and elements 34. In particular, the shaft 32 and elements 34 can be configured for propelling the edible product towards the opening as indicated by arrow 37. In addition, in case the chamber 31 is slightly tilted (FIG. 13) to use gravitational forces to let the product come out.

It may be desired to clean the system 1 and/or rinse it between the preparation of different types of cooled edible products. For this purpose, there can be provided a cleaning pod (not shown) having a shape similar to that of the pod 40, 40', and containing a cleaning agent which is configured to flow through the system 1 (similar to the edible ingredients and product) when the pod is connected to the machine.

Figure 14A:
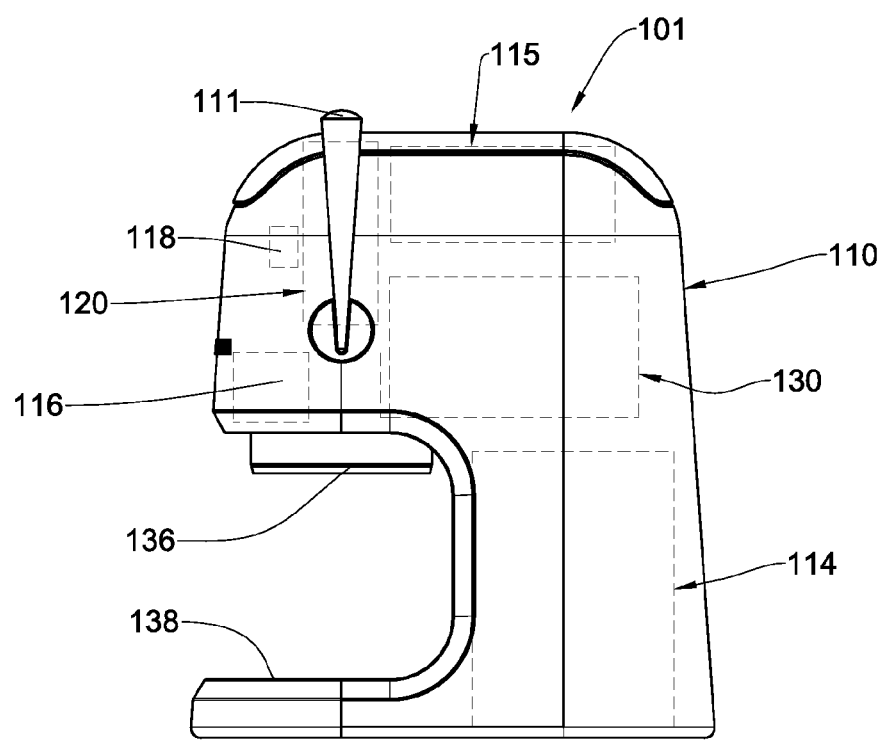
FIG. 14A is a schematic side view of a machine according to another example of the disclosed subject matter.
Figure 14B:
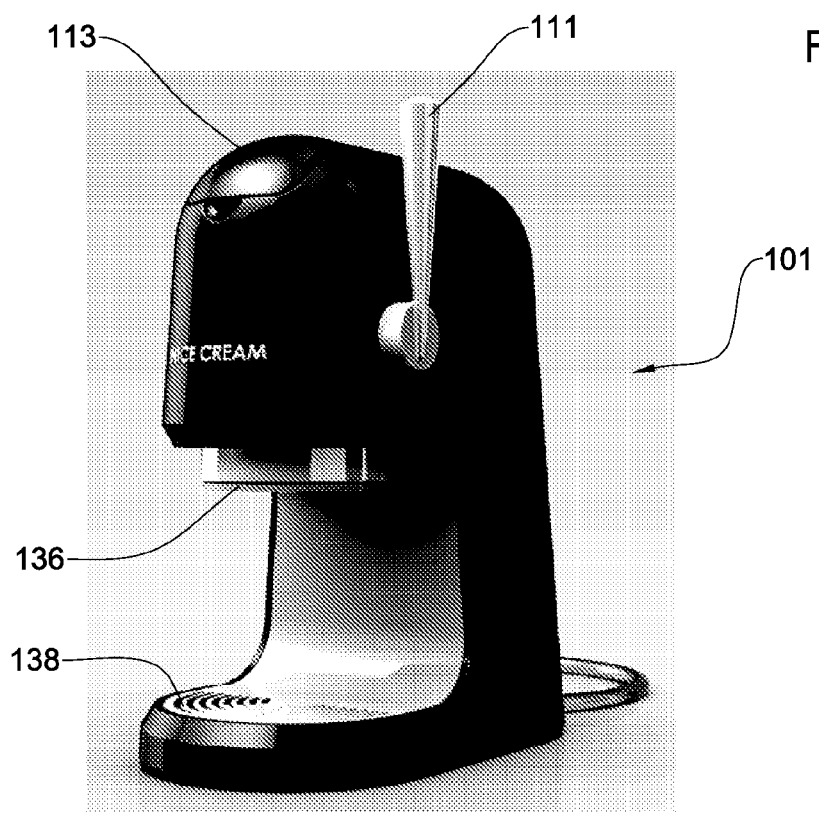
FIG. 14B is a schematic isometric view of the machine shown in FIG. 14A.

Turning now to FIGS. 14A and 14B, another design of a system for the preparation of a cooled edible product is shown, generally designated as 101, and comprising, similar to the previously described system 1, a main housing 110 accommodating therein a mixing chamber 120, a cooling chamber 130, a drive motor 115, a reader 118 and a controller 116.

The housing 110 is provided with a dispenser opening 136 configured for providing the cooled edible product (once prepared), a base 138 configured for positioning thereon a receptacle for receiving therein the cooled edible product dispensed from the opening 136 and a handle 111 for operating the system 101.

In operation, a receptacle portion 144 of a pod 140 (see FIGS. 15A, 15B) is provided through a top opening 113 of the housing into the mixing chamber 120 and positioned so as to be aligned with the position of the reader 118. The reader 118 is then configured for obtaining from the pod the required process parameters for the preparation of the cooled edible product, and provide the same to the controller 116.

Once all the required information is obtained by the controller 116, the latter can regulate operation of the mixing chamber 120, cooling chamber 130 and drive motor 115 for producing the edible product.

When the edible product is ready, the operator of the machine can be prompted by the system 101 (either by a visual or auditory aid) to operate the handle 111 of the system 101 in order to open the dispensing opening and allow the cooled edible product to be dispensed therefrom into a designated receptacle (not shown) placed on the base 138.

As appreciated from above, since the entire information regarding process parameters is provided by the pod itself, the entire system 101 can include a single handle (and possibly an on/off button) required for operating it, making the system 101 extremely simple and user friendly.

Figure 15A:
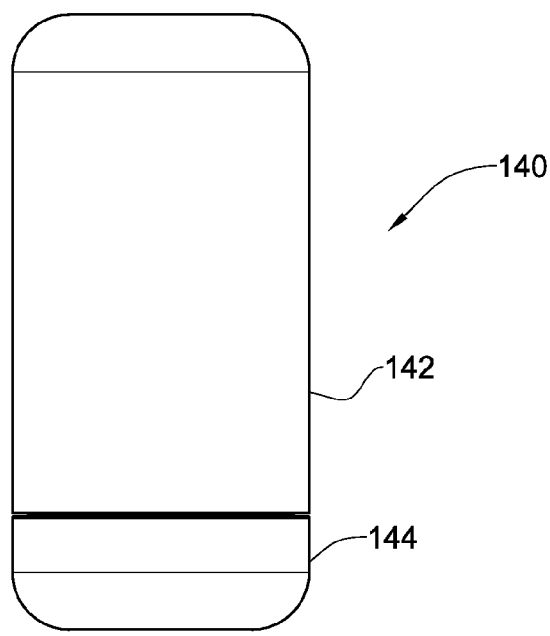
FIG. 15A is a schematic front view of a wet pod according to another example of the disclosed subject matter.
Figure 15B:
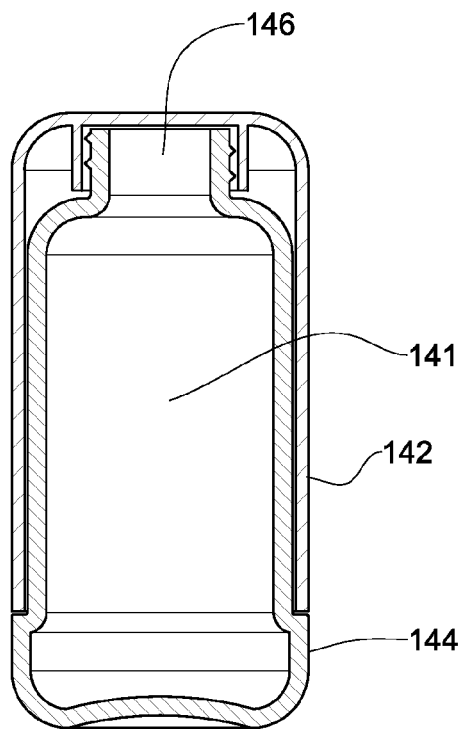
FIG. 15B is a schematic front view of the wet pod shown in FIG. 15A, including hidden lines.

Turning now to FIGS. 15A and 15B, a 'wet pod' is shown generally being designated as 140, and comprising a receptacle portion 144 and a cap 142. The receptacle portion 144 is formed with a cavity 141 configured for containing therein ingredients for the production of the cooled edible products and a mixing port 146 configured for operating in conjunction with the mixing chamber 120. The cap 142 is formed with a cavity configured for accommodating, almost fully, the receptacle portion 144.

It is appreciated that the term 'wet pod' refers to a receptacle which does not necessarily require the addition of a fluid to its contained ingredients in order to produce the cooled edible product. In other words, the wet pod can contain therein all the required ingredients for producing the cooled edible product, without requiring any additional ingredients.

In operation, the cap 142 of the pod can be removed before its insertion into the housing 110, and be placed on the base 138 to be used as the receptacle configured for receiving therein the cooled edible product. It is also appreciated that while the volume of the cap 142 is smaller than that of the receptacle portion 144, it is still appropriately sized for receiving therein the cooled edible product, similar to an ice cream cup/cone which normally accommodates a greater amount of ice cream than its volume.

Figure 16:
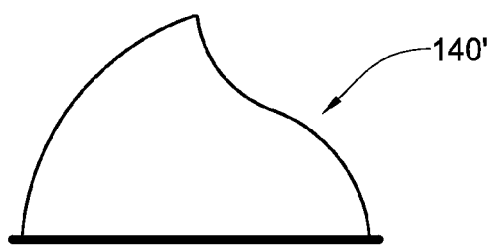
FIG. 16 is a schematic front view of a dry pod according to another example of the disclosed subject matter.

With reference to FIG. 16, another design of a 'dry pod' is shown, generally designated as 140, which is configured, contrary to the 'wet pod', for containing therein only some of the ingredients for the preparation of the cooled edible products, and required the addition of a fluid and/or further ingredients. On the other hand, the use of a 'dry pod' allows reducing the overall volume of the pod.

Attention is now turned to FIGS. 18A to 18D, in which another example of the machine is shown, generally being designated as 200. As in previous examples, the machine 200 includes a housing 210 accommodating therein a mixing chamber 220 configured for receiving therein a pod 240, 240' containing at least some ingredients for the preparation of the chilled edible product, a cooling chamber 230 for cooling the edible product/ingredients and a compressor 214.

The machine 200 is further provided with a dispensing opening 236 configured for dispensing of the chilled edible product to a user of the machine and a receptacle tray 238 for positioning thereon a receptacle for the chilled edible product. Control over dispensing is performed using a utility handle 211 articulated to the dispensing opening.

Figure 18A:
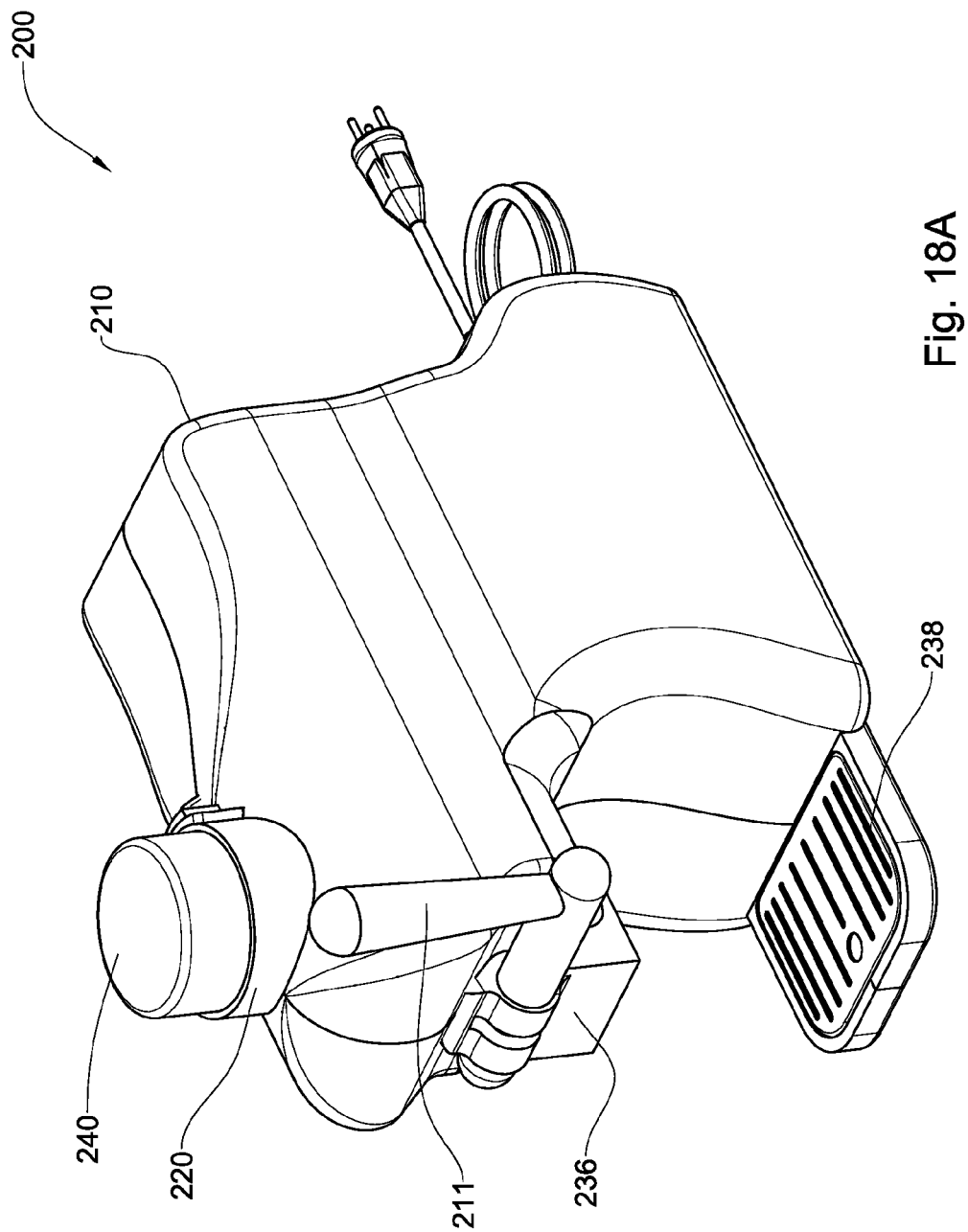
FIG. 18A is a schematic isometric view of one example of the machine according to the subject matter of the present application.
Figure 18B:
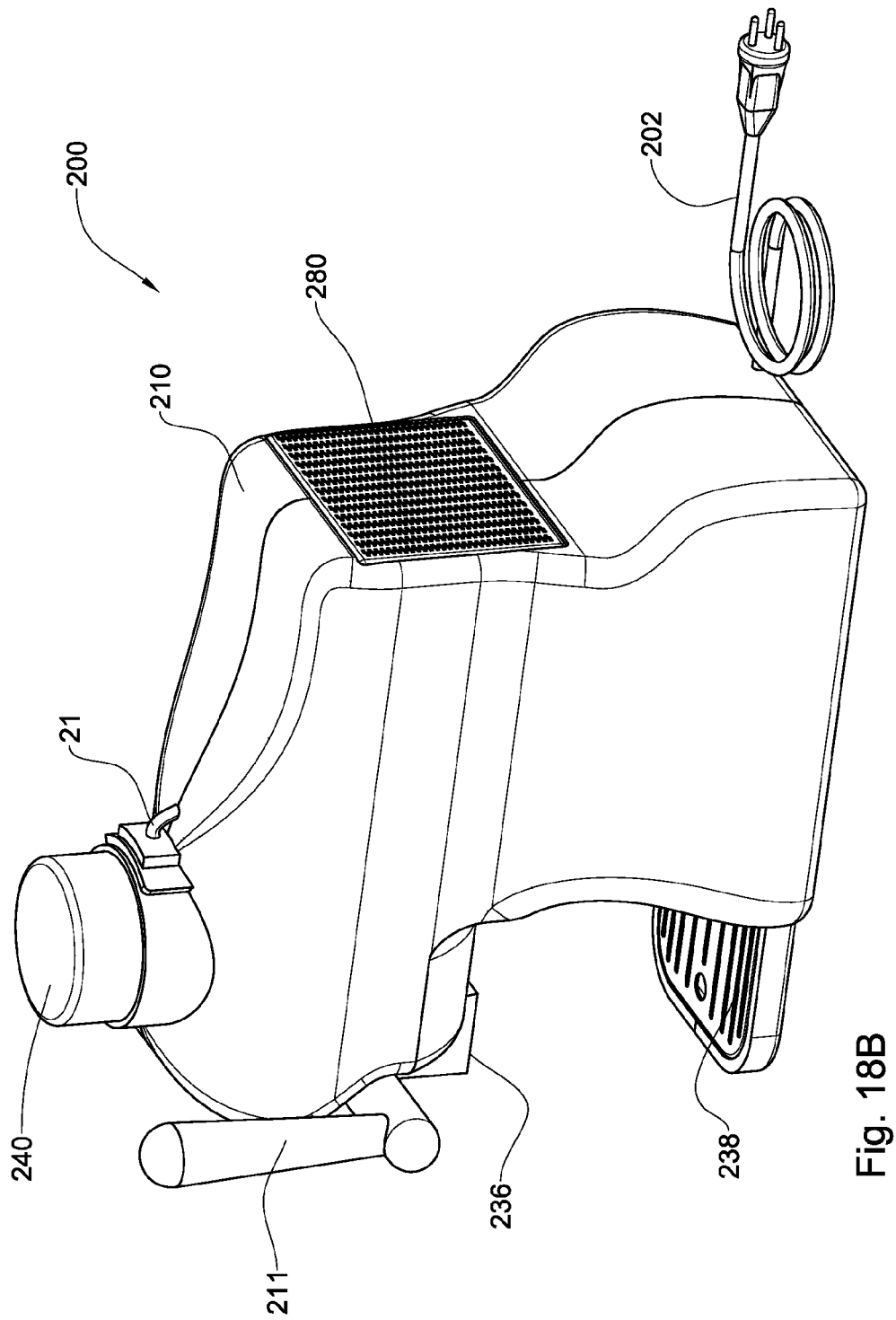
FIG. 18B is a schematic rear isometric view of the machine shown in FIG. 18A.
Figure 18C:
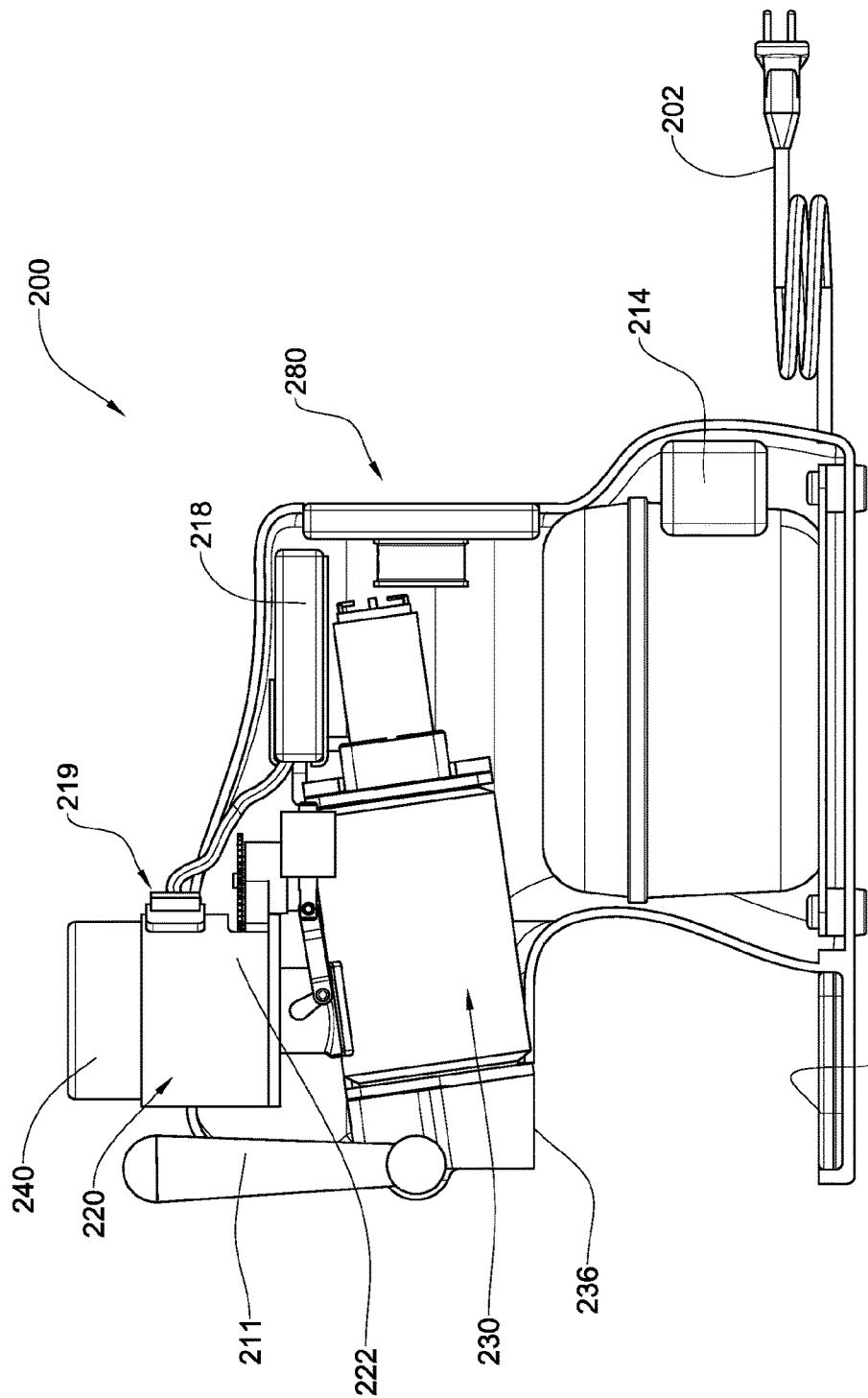
FIG. 18C is a longitudinal schematic cross-sectional view of the machine shown in FIG. 18A.

With particular reference to FIG. 18C, the mixing chamber 220 has a cavity 222 configured for receiving therein the pod 240 and is fitted with data reader 219 configured for receiving data from a data source 249 of the pod 240 and transmit the data to the control unit 218.

Figure 18D:
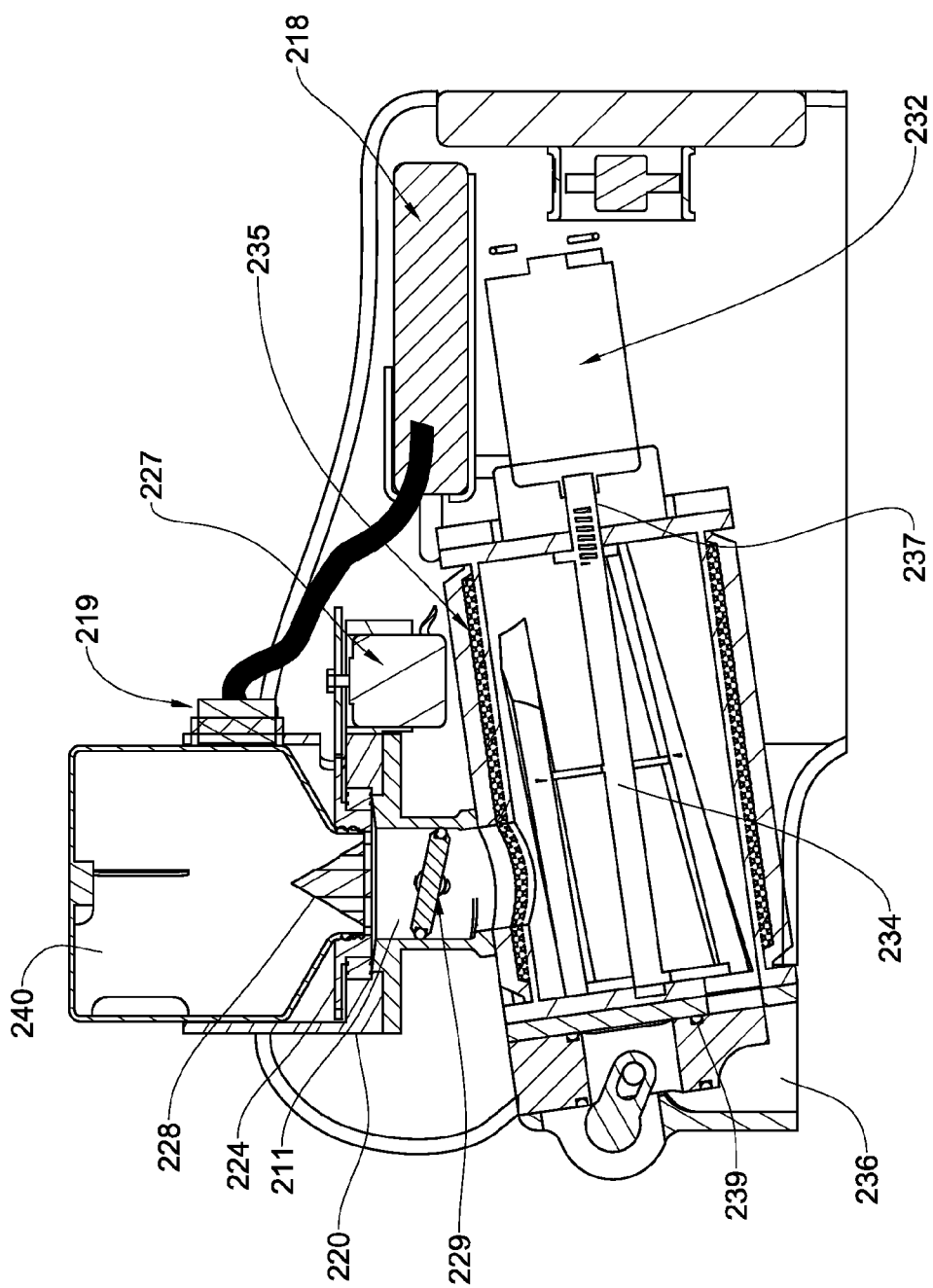
FIG. 18D is a schematic enlarged view of a portion of the cross-section shown in FIG. 18C.

Reference is now made to FIG. 18D in which a cross-section of the machine 200 is shown. It is observed that the mixing chamber 220 comprises at the bottom end thereof a piercing element 228 configured for puncturing a closure of the pod 240 when received within the mixing chamber 220 (see also FIGS. 19A to 20B), to allow extraction of the ingredients from the pod into the cooling chamber 230 after mixing takes place in the mixing chamber 220. For this purpose, the piercing element 228 is of a tapering shape ending with a tip sharp enough to pierce the closure.

The piercing element 228 is mounted on a rotor plate 224 configured for revolving the pod 240 and/or mixing the ingredients therein. It is also noted that the piercing element 228 is designed to be wide enough to assist in the mixing of the ingredients contained within the pod 240 during the mixing stage. Mixing is further facilitated by winglets 246 formed within the receptacle 240.

The passageway between the mixing chamber 220 and the cooling chamber 230 is provided with a valve 229 configured for regulating passage of mixed ingredients between the chambers 220, 230. The valve 229 is also associated with the controller 218 and the operation of which is regulated thereby.

As in previous examples, the cooling chamber 230 comprises a mixing motor and a mixing element 234, and is slightly inclined towards the outlet nozzle 236 so as to utilize gravitational forces in dispensing of the cooled edible product. In addition, the cooling chamber 230 is provided with a valve 239 configured for regulating dispensing of the cooled edible product therefrom. In particular, the valve can be configured for preventing emission of the cooled edible product from the cooling chamber 230 before it is fully ready.

Figure 19B:
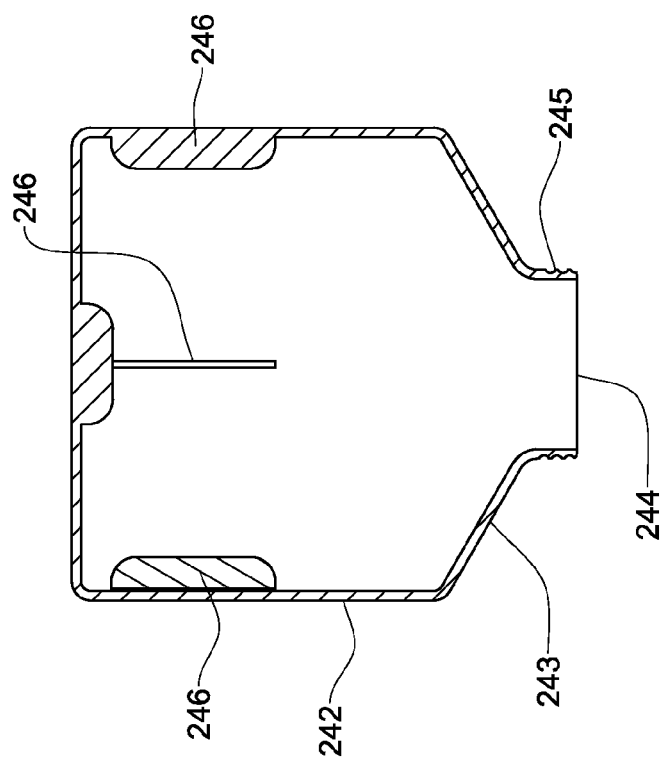
FIGS. 19A and 19B are schematic bottom isometric and cross-sectional views of a first example of a pod used in the machine shown in FIGS. 18A to 18D.
Figure 19A:
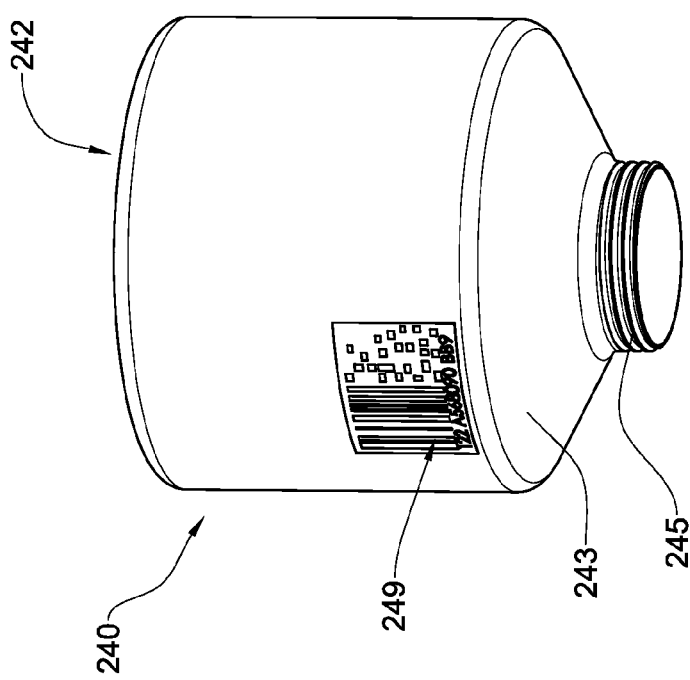

Turning now to FIGS. 19A and 19B, an integral pod 240 is shown being in the form of a receptacle 242 defining therein a cavity for containing the required ingredients for producing the cooled edible product.

The receptacle 242 is formed with a threaded attachment port 245 and has an opening sealed by a foil closure 244. When the pod 240 is received within the mixing chamber 220 of the machine 200 (see FIG. 18D), the piercing element 228 is configured for puncturing the foil, allowing the ingredients to be received within the mixing chamber 220.

It is appreciated that the mixing of the ingredients within the mixing chamber 220 actually takes place within the pod 240, as the pod is sized and shaped to be precisely received within the mixing chamber 220. It is noted here that the mixing chamber 220 is only configured, in the example, for operating in conjunction with a genuine pod 240 of the machine.

The pod 240 has fitted thereto and/or integrally formed therewith a data label 249 configured for communicating with the data reader 219 of the machine 200, for providing the controller 218 with the required information for producing the cooled edible products.

Figure 20B:
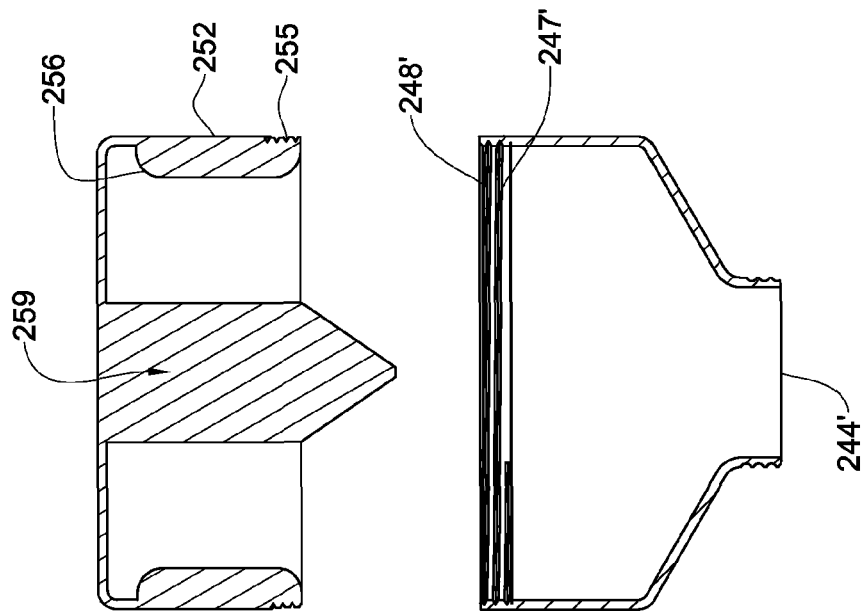
FIGS. 20A and 20B are schematic bottom isometric and cross-sectional views of a second example of a pod used in the machine shown in FIGS. 18A to 18D.
Figure 20A:
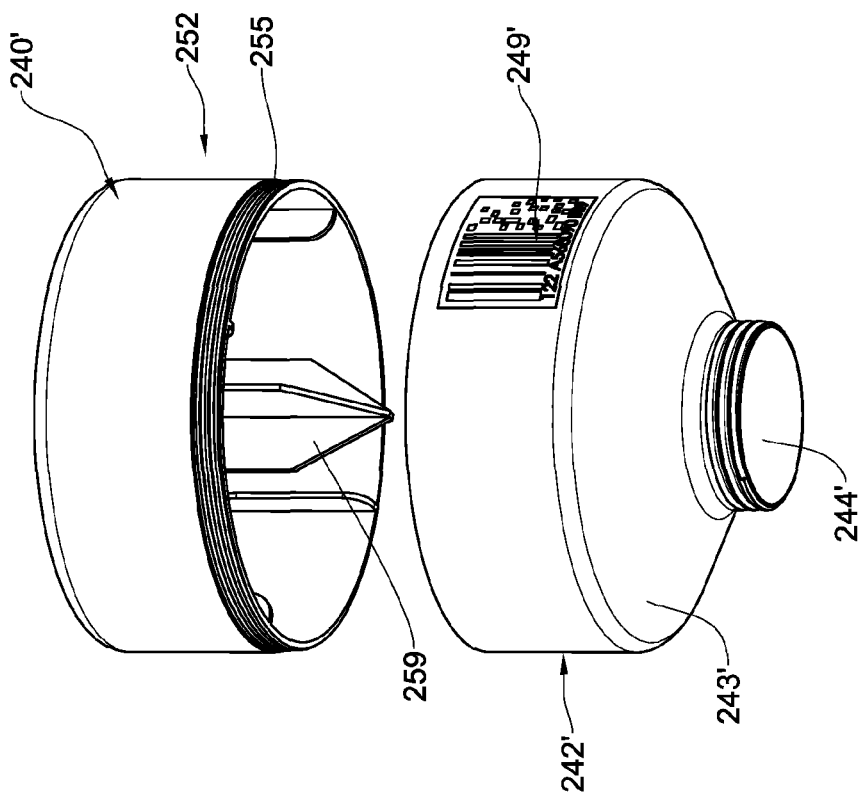

With attention being turned now to FIGS. 20A and 20B, a pod assembly 240' is shown comprising a first receptacle 242' and a second receptacle 252', being configured for attachment to one another. The receptacle 242' is essentially similar to the receptacle 242 with the difference being in the size (it is smaller) and in the amount and/or type of ingredients contained therein.

However, as opposed to the previously described pod 240, the receptacle 242' has a top foil closure 248' and an auxiliary attachment port 247' configured for attachment with a corresponding port 255 of the receptacle 252.

The receptacle 252 is an open receptacle and is configured for containing therein any desired liquid medium by choice of the user, which can be mixed with the ingredients of the receptacle 242' (e.g. juices, water etc.). The receptacle 252 is also formed with a piercing member 259 configured for puncturing the foil closure 248' of the receptacle 242' when the receptacles 242', 252 are properly attached to one another.

In assembly, the receptacle 252 can be an open end receptacle which can be filled with the desired liquid of choice and then the receptacle 242' can be mounted on the receptacle 252.

When attached, the receptacles 242', 252 form together a pod assembly which is very similar in shape and size to the original pod 240 and may thus function in the same way within the machine 200 and the mixing chamber 220, while providing the user with a greater variety of options and flavors.

Attention is now drawn to FIGS. 21A to 21E in which another example of the machine is shown, generally being designated as 200". As in the previous example, the machine 200" includes a housing 210" accommodating therein a mixing chamber 220" configured for receiving therein a capsule 240" (see FIG. 22) containing at least some ingredients for the preparation of the chilled edible product, a cooling chamber 230" for cooling the edible product/ingredients and a compressor 214".

However, as opposed to the previously described example, the machine 200" is configured for receiving therein a capsule 240" containing mostly 'dry' ingredients (solids, powders etc.) and the mixing chamber 220" is provided with a cover 217" configured for sealing the chamber 220" and a fluid inlet 215" leading thereto through the cover 217".

Figure 21B:
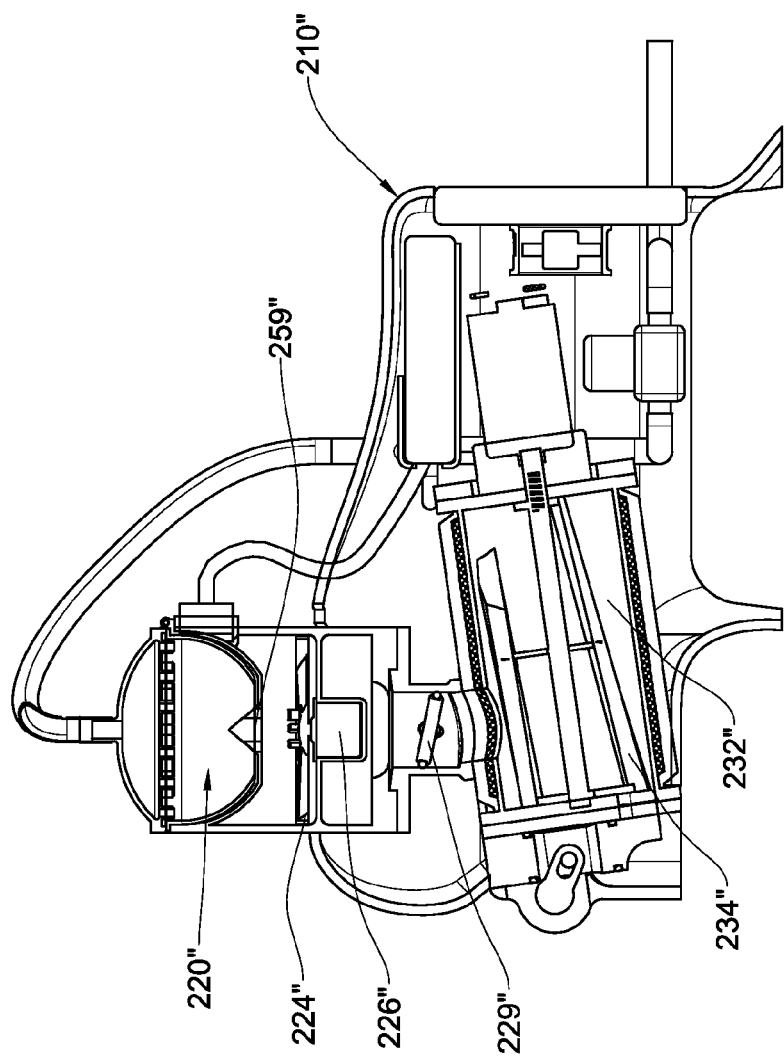
FIG. 21B is a longitudinal schematic cross-sectional view of the machine shown in FIG. 21A.
Figure 21C:
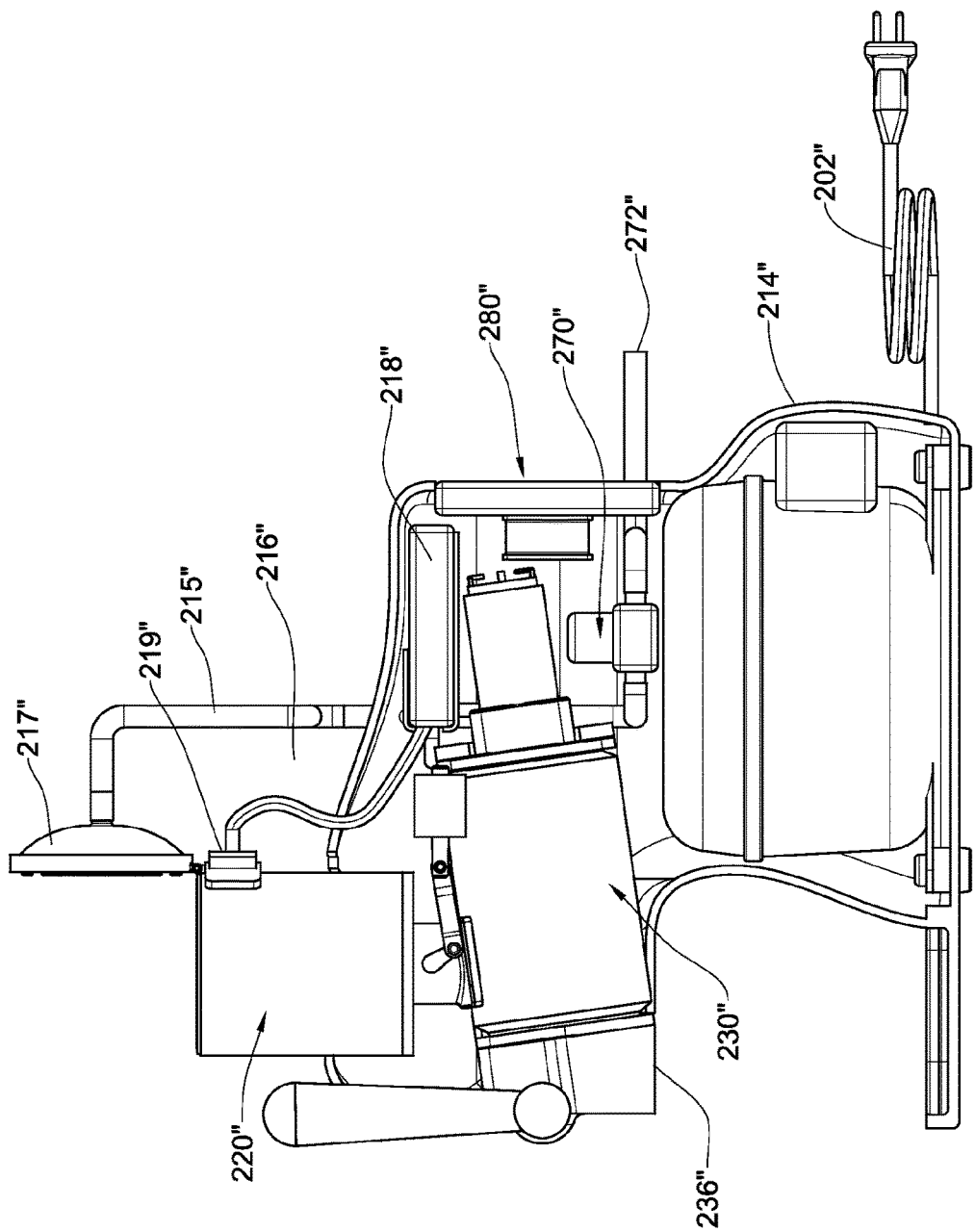
FIG. 21C is a schematic isometric view of the machine shown in FIG. 21A during a second position thereof, with a housing thereof being partially removed for illustration purposes.
Figure 21E:
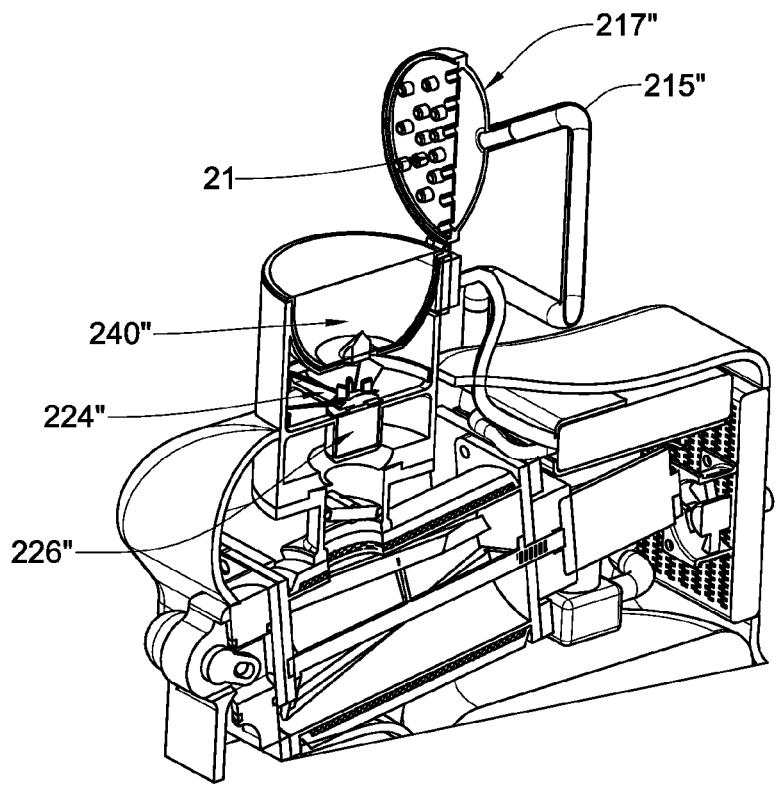
FIG. 21E is a schematic isometric cross-sectional view of the machine shown in FIG. 21D.

With particular attention being drawn to FIG. 21B, the capsule 240" is smaller than the mixing chamber and does not fill the entire cavity thereof (like the previously described pods 240, 240'). Instead, fluid is configured for being passed through the cover 217" and into the capsule, so that a mix of the external fluid and ingredients from the capsule 240" are provided into the mixing chamber 220" where they are then mixed.

In order to provide better diffusion and mixing of the external fluid with the ingredients within the pod, the cover 217" is provided with multiple fluid outlets leading into the capsule 240". The outlets are also designed to puncture a top foil closure of the capsule 240" once placed within the mixing chamber 220" and the cover 217" is properly closed.

Once the mix of external fluid and ingredients are provided into the mixing chamber 220", mixing takes place there and from then on the manufacture process is very similar to the previously described process of producing the cooled edible product. However, it is appreciated that during mixing, some of the ingredients may remain within the capsule and be mixed there as well, though, not as efficiently as within the mixing chamber.

Figure 17:
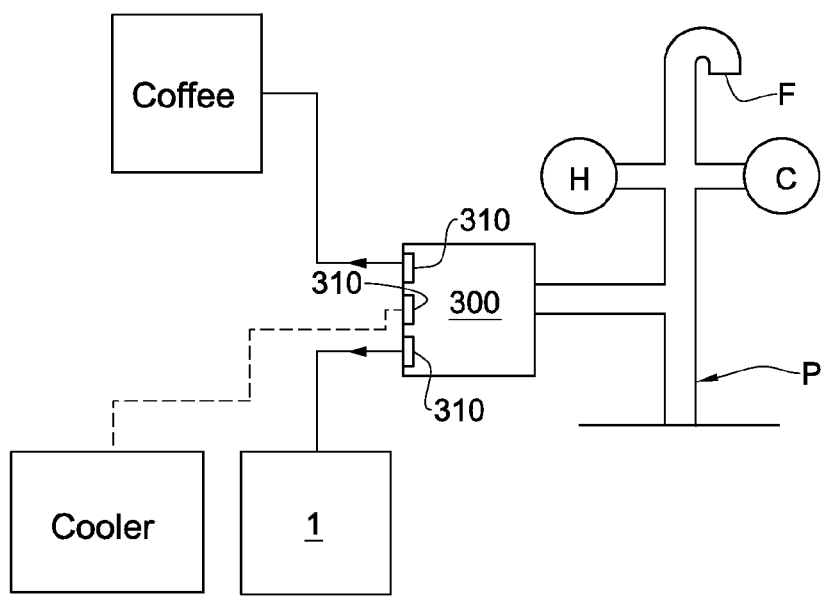
FIG. 17 is a schematic diagram of a temperature regulating module according to the disclosed subject matter of the present application.
Figure 22:
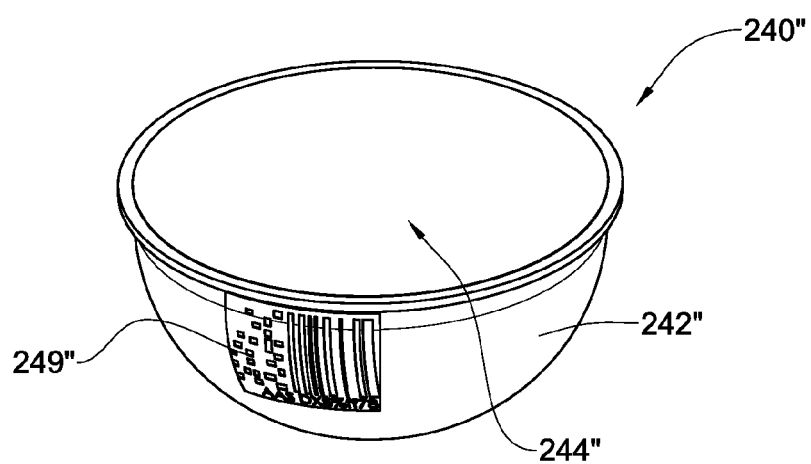
FIG. 22 is a schematic isometric view of a pod used in the machine shown in FIGS. 21A to 21E.

Attention is now drawn to FIG. 22, in which a capsule 240" is shown comprising a housing 242", a top foil closure 244", a bottom closure 243" (seen in FIG. 21B) and a data label 249". The capsule 240" is considerably smaller than the pods 240, 240' previously descried and is similar, in general, to coffee capsules. The capsule 240" is configured for being placed within the mixing chamber 220" so that the bottom foil closure 243" thereof is punctured by the piercing element 228 while the top foil cover thereof 244" is configured for being punctured by the outlets formed in the cover 217" when it is properly closed. Turning now to FIG. 17, a domestic water supply piping P is shown comprising a faucet F and a hot and cold regulation handles H and C respectively. According to the disclosed subject matter there is provided a water temperature regulation module 300 being in fluid communication with the piping P.

The module 300 comprises an inlet for receiving fluid from the main piping P, an heating/cooling unit (not shown) and a plurality of ports 310 configured for outputting the received fluid at a desired temperature.

The module 300 is configured for allowing a plurality of different kitchen appliances (e.g. coffee machine, cooler, the systems 1, 101 of the present application) to connect to the ports 310 and receiving from the module the fluid at a desired temperature.

At present, each of these kitchen appliances is provided with its own heating/cooling module and/or heating body etc. Employing the use of the temperature regulating module 300 allows eliminating the need for a corresponding module in each of the kitchen appliances. This may allow reducing the size and shape of each of these appliances.

The module 300 can also be provided with a controller (not shown) configured for regulating the temperature of the incoming fluid and controlling provision of the heated/cooled fluid to the relevant port.

It should be understood that the controller can also be configured for being in communication with each of the connected kitchen appliances, so that the user is not required to operate the module 300, but rather only the desired appliance.

Those skilled in the art to which this invention pertains will readily appreciate that numerous changes, variations, and modification can be made without departing from the scope of the invention, mutatis mutandis.

The invention claimed is:

1. A system for the preparation of a cooled edible product from ingredients, said system comprising:
   a processor that processes the ingredients, a controller that controls the operation of the processor, a data reader, and a pod;
   the pod
      comprising at least some of the ingredients in an amount for the preparation of one serving of the cooled edible product,
      having a rupturable closure sealing an opening and configured for coupling with the processor and for emptying into the processor after the seal is ruptured at least a majority of the contents of the pod, and
      comprises processing data indicative of all process parameters and steps for processing the ingredients by the processor to obtain the cooled edible product after extraction of the ingredients from the pod, said process parameters and steps being specific for the ingredients, the processing data being formatted in a manner permitting acquisition of the processing data by the data reader;
   the data reader
      being connected to the controller, and
      being capable of reading the processing data carried by said pod and transferring such processing data to the controller;
   the controller
      being capable of using the processing data provided thereto by the data reader and controlling the operation of the processor so as to cause all process parameters conducted by the processor to be determined by the processing data obtained from the pod by the data reader; and
   the processor
      comprising a mixing chamber and a cooling arrangement for mixing the ingredients and cooling the mixture to thereby obtain the cooled edible product,
      being associated with and controlled by said controller, and
      being configured for coupling with the pod to receive ingredients therefrom, and to transfer such ingredients to the mixing chamber.

2. A system according to claim 1, wherein the processor is configured for introducing into said mixing chamber at least one additional ingredient from a source other than the pod.

3. A system according to claim 1, wherein said processor comprises an arrangement for introducing gas into the mixture of the edible ingredients to form an aerated mixture.

4. A system according to claim 1, wherein said process parameters are at least one of the following:
   mixing time;
   quantity of an additional ingredient;
   timing of introduction of an additional ingredient;
   timing for aeration of the mixture;
   amount of gas introduced into the mixture for the aeration;
   cooling time of an aerated mixture;
   revolution velocity of a dasher within the mixing chamber;
   temperature reduction of the aerated mixture;
   pressure within the mixing chamber; and
   rate of dispensing of said edible product through an outlet.

5. A system according to claim 1, wherein said process parameters correspond to the amount of ingredients in the pod.

6. A system according to claim 1, wherein said data includes an authentication code for validating processing performance by the processor.

7. A system according to claim 1, wherein said system is configured for receiving a cleaning pod containing at least one cleaning agent.

8. A system according to claim 1, wherein the process parameters determine operation of the system in a manner intended for ensuring proper emptying of the mixing chamber.

9. A system according to claim 1, comprising at least two ports and configured for simultaneously coupling to more than one pod.

10. A system according to claim 1, configured for receiving a magazine of pods for successive production of a plurality of one serving of cooled edible products.

11. A system according to claim 1, wherein the processor further comprises an auxiliary cooling arrangement for accelerating the cooling process in the mixing chamber.

* * * * *